July 4, 1961
L. R. ROBINSON ET AL
2,991,114
SUPPORTING GLASS SHEETS
Filed Oct. 23, 1958
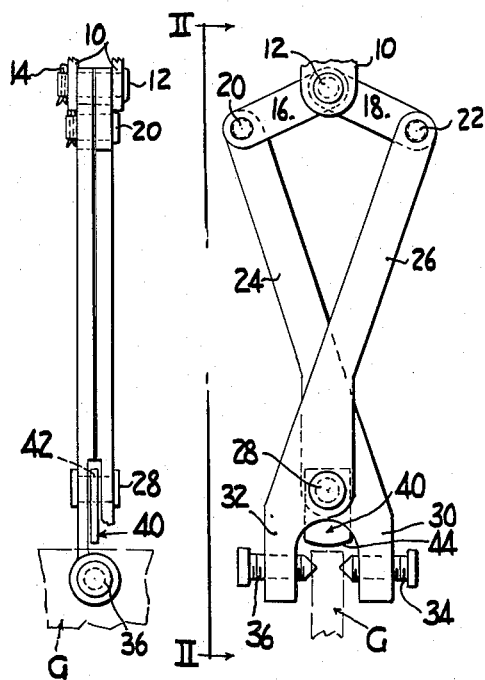
INVENTORS
LEE R. ROBINSON
GEORGE W. STILLEY and
BY JAMES H. CYPHER
Oscar L. Spencer
ATTORNEY

United States Patent Office 2,991,114
Patented July 4, 1961

2,991,114
SUPPORTING GLASS SHEETS
Lee R. Robinson, Tarentum, George W. Stilley, Sarver, and James H. Cypher, New Kensington, Pa., assignors to Pittsburgh Plate Glass Company, a corporation of Pennsylvania
Filed Oct. 23, 1958, Ser. No. 769,194
4 Claims. (Cl. 294—118)

This invention relates to supporting glass sheets, and specifically refers to tongs for gripping glass sheets during thermal treatment.

Tongs have been used for supporting glass sheets vertically for thermal treatment by gripping the opposite glass surfaces. The tongs are supported by a clevis attached to a carriage which rides an overhead monorail extending through thermal treatment apparatus.

Since glass sheets are heated to substantially the softening point during thermal treatment required for tempering or certain coating procedures, the tong points penetrate the glass surfaces and mar the latter. When coated or tempered glass sheets are used as viewing closures, it is necessary that tong marks caused by tong penetration be kept close to the margin of the glass sheets so that they do not mar the vision area.

To avoid the presence of tong marks in the viewing area, glass sheet gripping tongs have been provided with a stop member to limit the uppermost position of the upper edge of the glass sheet supported between the tongs for tempering. In the past, the stop member comprised a stop pin welded to one of the tong arms below the common pivot point for the tongs and above the tong points.

When glass sheets are supported by tongs for tempering, their upper edges are brought into contact with one or more stop members. When the glass sheets soften, the tong points penetrate into the glass, causing the tong arms to pivot about the common pivot point. However, as the tong arms pivot, the stop member moves downwardly to apply a downward force against the upper edge of the glass sheet. This downward force frequently pried the glass downwardly from between the tong points and out of gripping engagement therebetween.

The present invention prevents this cause of breakage by providing glass support tongs with a different type of stop member for limiting the uppermost position of the top edge of a glass sheet supported for tempering. The stop member according to the present invention is pivotally attached to the common pivot point for the tongs.

According to the present invention, the glass edge contacting surface of the stop member is so constructed that it does not move downwardly against the top edge of the gripped glass sheet regardless of the pivoting of the tong arms. When a glass sheet is initially supported by tongs, the tong points are separated from each other a distance substantially equal to the thickness of the glass sheet. At this distance of separation, the spaced, opposed tong points are substantially coaxial. When the glass sheet softens during heat softening, the tong points press into the opposite surfaces of the glass sheet. As the tong points move toward each other, the tong arms pivot about the tong hinge pin so as to increase the vertical distance between the tong hinge pin and the tong points. This lowers the glass sheet out of contact with the stop member.

A typical embodiment illustrating the present invention will now be described to facilitate its understanding.

In the drawings which form part of the description,

FIGURE 1 is an elevational view of a portion of a pair of glass supporting tongs taken across the thickness of a sheet of glass shown in phantom supported by said tongs.

FIGURE 2 is an end view taken along the lines II—II of FIGURE 1 and with certain parts removed for improving the understanding of the present invention.

Referring to the drawings, tong support means comprising a clevis 10 is carried by a carriage (not shown) supported on a monorail (not shown) which extends through a heating furnace and either a quenching station or a coating station. Since the heating furnace and quenching station or coating station are not part of the present invention, they will not be described in detail.

The clevis 10 provides a support for a tong support pin 12 extending therethrough and secured in place by means of a cotter pin 14. Upper links 16 and 18 are pivoted to tong support pin 12 at their upper ends and at their bottom ends carry one of a pair of link pins 20 and 22 which pivotally secure the upper links 16 and 18 to tong arms 24 and 26. A common hinge pin 28 pivotally secures tong arms 24 and 26 to each other. The tong support pin 12, the link pins 20 and 22 and the common hinge pin 28 provides substantially parallel horizontal axes about which the upper links 16 and 18 and the tong arms 24 and 26 pivot relative to each other.

Tong arm 24 terminates in a bottom portion 30 of reduced thickness, while tong arm 26 terminates in a bottom portion 32, also of reduced thickness. The respective bottom portions are apertured along axes normal to link pins 20 and 22 and common hinge pin 28 to receive pointed screws 34 and 36, respectively. The opposed points of the pointed screws 34 and 36 form the tong points between which a glass sheet is gripped. The tong arms and links are so constructed that the tong points 34 and 36 are substantially coaxial when separated from one another by the thickness of a glass sheet inserted therebetween and are urged to move toward each other to grip a sheet of glass G therebetween.

A stop member 40 is apertured at 42 to receive the common hinge pin 28. Stop member 40 is sandwiched between the bottom portion 30 of tong arm 24 and bottom portion 32 of tong arm 26 in such a manner that the apertures are aligned to receive the common hinge pin 28. The bottom edge 44 of stop member 40 is preferably of convex construction so as to make tangential contact with the upper edge of a glass sheet G. Also, the stop member 40 is so constructed that its center of gravity is located within the portion provided with the arcuate surface 44, thus insuring that the arcuate surface 44 is in position to contact the upper edge of a glass sheet G.

In the view shown in FIGURES 1 and 2, the glass sheet G has already been softened somewhat and the tong points 34 and 36 have penetrated the glass sheet somewhat, thus causing the upper edge of the glass sheet to be separated from the bottom surface 44 of the stop member 40. It is this separation between the upper edge of the glass sheet and the bottom surface 44 of the stop member 40 during softening of the glass sheet that provides the beneficial results inherent in the present invention.

A particular embodiment of the present invention has been described for purposes of illustration rather than limitation. Reference to the latter may be obtained from studying the accompanying claims.

What is claimed is:

1. Tongs for supporting a glass sheet comprising tong support means, a pair of link pins, a pair of upper links pivotally connected between the tong support means and each of said link pins, a pair of tong arms pivotally interconnected to one another at a common hinge pin, said tong arms including a tong arm pivotally connected between one of said link pins and said common hinge pin and another tong arm pivotally connected between the other of said upper links and said common hinge pin, each tong arm having a lower extremity portion extending below said common hinge pin, a stop member for limiting the uppermost position of the top edge of the glass sheet to a position below that of said common hinge pin, said stop member comprising an apertured portion pivoted to said common hinge pin, a smooth, convex glass edge contacting surface at the bottom of said stop member, and tong point means carried by the lower extremity portion of each said tong arm below said common hinge pin and below the lowermost portion of said convex glass edge contacting surface, each said tong point means being in opposing relation to each other for gripping the glass sheet therebetween and for moving the gripped glass sheet downwardly so that its upper edge moves out of contact with said stop member as said tong point means penetrate the opposite glass sheet surfaces.

2. Apparatus as in claim 1, wherein the tong arms each have a portion of reduced thickness in the vicinity of its pivotal connection to receive the stop member therebetween.

3. Apparatus as in claim 1, wherein said tong point means are substantially coaxial when separated from each other by a distance equal to the thickness of a glass sheet inserted therebetween.

4. Apparatus as in claim 1, wherein the center of gravity of said apertured stop member is located below said apertured portion.

References Cited in the file of this patent
UNITED STATES PATENTS

| | | |
|---|---|---|
| 2,174,254 | Black | Sept. 26, 1939 |
| 2,387,408 | Pertuit | Oct. 23, 1945 |
| 2,618,505 | Rosenbaum | Nov. 18, 1952 |
| 2,806,734 | Klomp | Sept. 17, 1957 |